(12) United States Patent
Korndorfer et al.

(10) Patent No.: US 7,210,916 B2
(45) Date of Patent: May 1, 2007

(54) DEVICE FOR INSERTING STICKS INTO MOULDS FOR PRODUCING CONFECTIONERY ON A STICK

(75) Inventors: Klaus Korndorfer, Heilbronn (DE); Werner Kerres, Leutesdorf (DE)

(73) Assignee: Hosokawa Bepex GmbH, Leingarten (DE)

( * ) Notice: Subject to any disclaimer, the term of this patent is extended or adjusted under 35 U.S.C. 154(b) by 225 days.

(21) Appl. No.: 10/530,937

(22) PCT Filed: Jan. 27, 2004

(86) PCT No.: PCT/EP2004/000692

§ 371 (c)(1),
(2), (4) Date: Apr. 8, 2005

(87) PCT Pub. No.: WO2004/066747

PCT Pub. Date: Aug. 12, 2004

(65) Prior Publication Data

US 2006/0165830 A1 Jul. 27, 2006

(30) Foreign Application Priority Data

Jan. 30, 2003 (DE) ................................ 103 03 726

(51) Int. Cl.
*A23G 7/00* (2006.01)
(52) U.S. Cl. .................................... 425/126.2; 425/453
(58) Field of Classification Search ............. 425/126.2, 425/453; 426/421, 515
See application file for complete search history.

(56) References Cited

U.S. PATENT DOCUMENTS

| | | | | |
|---|---|---|---|---|
| 2,884,875 A | * | 5/1959 | Rasmusson | 425/126.2 |
| 4,008,812 A | | 2/1977 | Stuart | |
| 4,159,612 A | * | 7/1979 | Johnson et al. | 425/126.2 |
| 4,699,583 A | * | 10/1987 | Grigoli et al. | 425/261 |
| 4,819,449 A | * | 4/1989 | Curti et al. | 425/126.2 |
| 5,085,059 A | * | 2/1992 | Grigoli et al. | 425/253 |

FOREIGN PATENT DOCUMENTS

| | | |
|---|---|---|
| DE | 3919324 A1 | 12/1989 |
| GB | 2219725 A | * 12/1989 |

* cited by examiner

*Primary Examiner*—Robert B. Davis
(74) *Attorney, Agent, or Firm*—Woodard, Emhardt, Moriarty, McNett & Henry LLP

(57) ABSTRACT

Moulds (12) which comprise mould cavities (20) which are arranged next to one another in rows and may be filled with confectionery mass (K) are arranged on a mould conveyor (10) one behind the other in the conveying direction (a) thereof. On a rotary body (34), which may rotate stepwise about an axis of rotation (36) arranged parallel to the rows of mould cavities (20), stick holders (42) are arranged at angular distances corresponding to the rotary steps. The stick holders (42) comprise rows of radial channels (44), into each of which a stick (S) may be inserted radially from the outside inwards, such that the sticks (S) are held in a position in which they project radially away from the rotary body (34). With each turn of the rotary body (34), each stick holder (42) finds itself opposite a feeder (50) in a first rotational angle position, in order to take therefrom a row of sticks (S), and in a last rotational angle position opposite a row of mould cavities (20), into each of which a stick (S) may be inserted by being pushed radially from the inside outwards out of its channel (44). The rotary body (34) has an annular cross section, which leaves an annular space (40) free around a shaft member (38) defining the axis of rotation (36). The radial channels (44) open into the annular space (40) and an ejector (64) common to all the stick holders (42) is arranged non-rotatably therein and comprises plungers (66) for pushing the sticks (S) out of the channels (44). These plungers (66) enter the channels (44) directed towards a row of mould cavities (20) in each case when the rotary body (34) is at a standstill and are withdrawn back into the annular space (40) before the next step of the rotary body (34).

9 Claims, 7 Drawing Sheets

DEVICE FOR INSERTING STICKS INTO MOULDS FOR PRODUCING CONFECTIONERY ON A STICK

We hereby claim foreign priority benefits under Title 35, United States Code, § 119 from German Patent Application No. 103 03 726.8, filed Jan. 30, 2003.

The invention relates to a device for inserting sticks into moulds for producing confectionery on a stick. For the purposes of this invention, confectionery on a stick should be understood to mean any preparation consumable by nibbling or sucking, for example made of sugar paste and/or chocolate mass or in the form of ice cream, which is connected with a stick for holding the preparation. The stick may consist of various materials, for example wood, rolled paper or plastics, and have a cross section which matches the purpose, for example circular or rectangular.

The invention relates in particular to a device according to the precharacterising clauses of claims 1 and 6. Such a device is known from DE 39 19 324 A1. In said patent, the rotary body takes the form of a turnstile, which comprises two channels normal to one another and to the axis of rotation of the rotary body, i.e. arranged in the shape of a cross, in each of which channels a slide is guided. The turnstile is rotatable in 90° steps, and the two slides are driven in such a way, in adaptation thereto, that each of them oscillates to and fro in its channel. Each of the two slides carries at each of its two ends a rod holding bar, a row of radial rods being attached to each of these rod holding bars, which rods are each guided in a radial tube of a row of tubes attached to the associated beam of the turnstile. During each revolution of the turnstile each row of tubes finds itself at one point opposite a feeder, by means of which a stick is inserted into each of all the tubes of said row radially from the outside inwards. After rotation of the turnstile by 90°, this row of tubes is positioned perpendicularly above a row of moulds, into which the sticks are inserted by a movement of the slide associated with their tubes. At the top of each row of moulds there is arranged a device whose job is to hold the sticks in position during solidification of the confectionery mass with which the moulds have previously been filled. This device consists of a pair of flaps, which are mounted on the top of the associated row of moulds so as to pivotable towards and away from one another in the manner of tongs, being spring-loaded for pivoting towards one another and exposed to the action of an actuating device to pivot them away from one another. The two flaps are pivoted away from one another when the sticks are being inserted each into a mould in the associated mould row; then the two flaps are pivoted towards one another into their closed position, in which the sticks are each centered in a notch formed at the edge of one of the two flaps and clamped in place by the opposing edge of the other flap.

The above-described known device for inserting sticks is complex to manufacture and maintain. This is true on the one hand of the turnstile design, in which the number of rods required for pushing out the sticks is four times as great as the number of moulds present in each mould row. Considerable effort is also needed to arrange, control and keep clean during operation the above-described flaps cooperating in the manner of tongs on each row of moulds.

The object of the invention is to provide a particularly simple, compact and reliably operating device for inserting sticks into moulds for producing confectionery on a stick.

The object is achieved according to the invention by the features of claim 1. Advantageous further developments are revealed by claims 2 to 5. Furthermore, the features of claim 6 and of the further developments described in claims 7 to 9 have made it possible to provide a particularly simple device for inserting sticks into moulds for producing confectionery on a stick even when it has to be taken into account that the confectionery mass to be processed will not have solidified sufficiently when the sticks are inserted to ensure by itself that the sticks retain their centered, generally perpendicular, position in which they have been inserted.

The invention has the advantage of being structurally substantially simpler than the above-described prior art, so not only making it simpler to produce the device according to the invention but also most particularly to keep it clean. Thus, the number of plungers required in total to push the sticks out of the channels in the rotary body is only the same as the number of moulds per row of moulds on the mould conveyor. All that is necessary to keep the sticks centered in the moulds until the confectionery mass introduced beforehand into the moulds has solidified is a lid for each row of moulds, which is simple compared with the known tong arrangement and accordingly easy to clean. The effort required to produce and maintain the lid positioning, lid removing and lid return devices according to the invention is low particularly in the case of an installation with a plurality of rows of moulds in comparison with the previous need to provide each individual row of moulds with a tong arrangement with controlled actuation.

An exemplary embodiment with further details of the invention is described below with reference to schematic drawings.

FIGS. 1 to 7 show a device which constitutes the essential part, according to the invention, of an installation for producing confectionery on a stick. The confectionery on a stick in the example illustrated is a ball of confectionery mass K, into which a stick S of circular cross section has been inserted radially.

Figure 1:
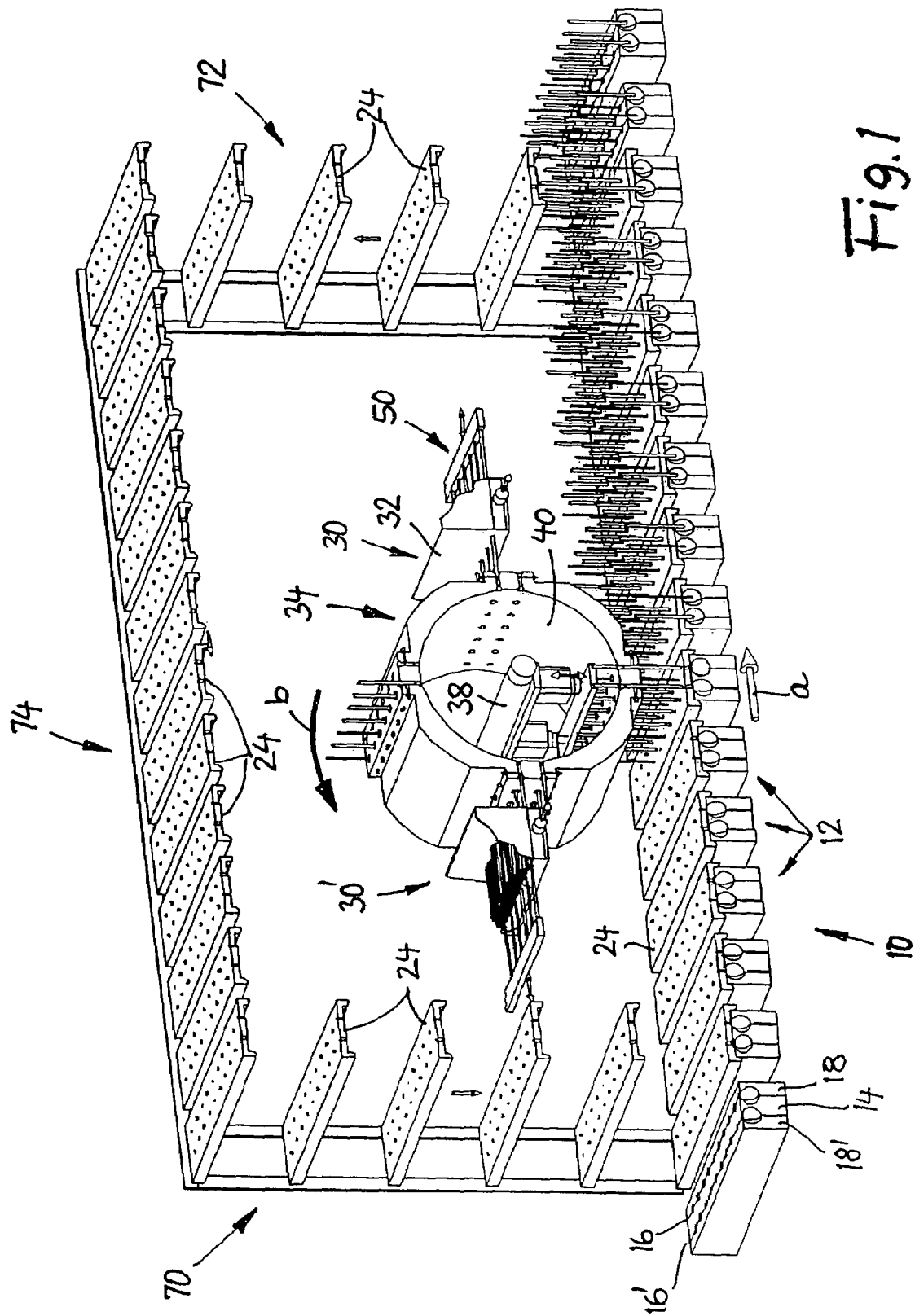
FIG. 1 is a perspective view of a device according to the invention, in section in a perpendicular longitudinal plane.
Figure 2:
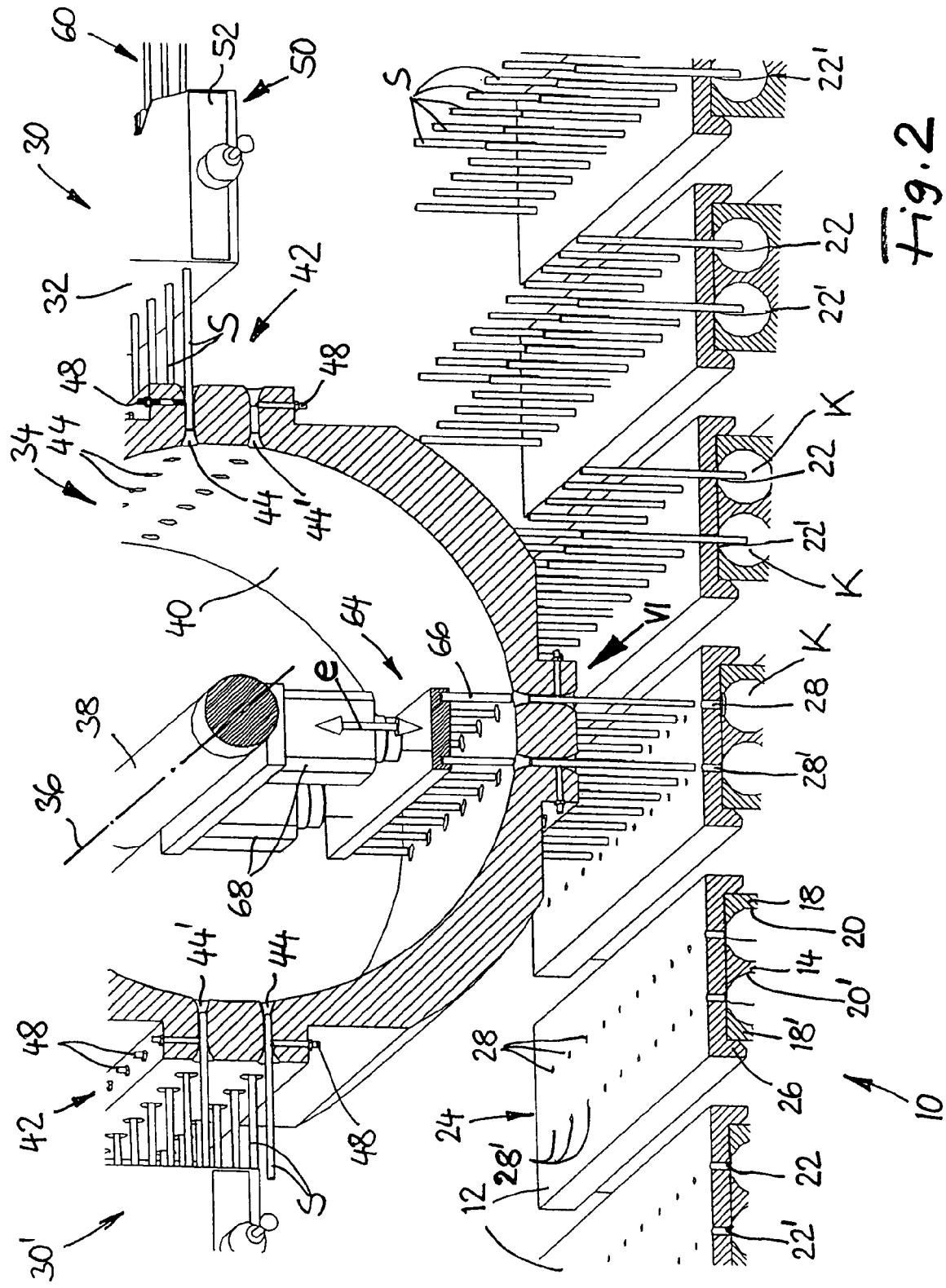
FIG. 2 shows an enlarged portion of FIG. 1 from a slightly different perspective.

FIGS. 1 and 2 show a horizontal portion of an endless mould conveyor 10, which comprises a plurality of moulds 12 arranged at uniform distances one behind the other and which may be moved in the conveying direction indicated with an arrow a in steps in each case by the distance between two moulds 12. From the point of view of explaining the invention, the overall design of the mould conveyor 10 and the way the moulds 12 are connected together are of no significance; for example, the mould conveyor may comprise two parallel conveyor chains, which run over return wheels and on which the moulds 12 are suspended in oscillating manner. The invention is also independent of the detailed design of the moulds 12; in the example shown, they each have a central mould part 14, which is connected in articulated manner with a front outer mould part 18 and a rear outer mould part 18' by hinges 16 and 16' arranged across the conveying direction a. The central mould part 14 forms together with the front outer mould part 18 a row of for example ten front mould cavities 20 arranged next to one another across the conveying direction a, and together with the rear outer mould part 18' a corresponding row of rear mould cavities 20'. Over the portion of the mould conveyor 10 depicted, all the moulds 12 are closed; the mould cavities 20 and 20' each have an inlet opening 22 or 22' respectively arranged at the top, through which they have been filled with confectionery mass K in an area of the installation which is not illustrated but which lies to the left of FIGS. 1 and 2.

The inlet openings 22 and 22' are relatively large, so that filling of the mould cavities 20 and 20' does not take much time and so that air pockets in the filled mould cavities are avoided. Because of their size, the inlet openings 22 and 22' are not in a position to hold the relatively slim sticks S in centered position when they are inserted into the confectionery mass K, which is still more or less liquid and thus cannot provide sufficient resistance to tilting of the sticks. Provision is therefore made to ensure centering of the sticks S in that each mould 12, after its mould cavities 20 and 20' have been filled with confectionery mass K, is covered with a lid 24, which is positioned with a collar 26 surrounding it on the mould 12 and comprises centering holes 28 and 28' arranged to coincide with the inlet openings 22 and 22' of said mould 12, the cross section of said centering holes 28 and 28' being sufficiently closely conformed to that of the sticks S to hold them in centered position. The sticks S are thus each inserted through a centering hole 28 or 28' and an inlet opening 22 or 22' into the confectionery mass K in the relevant mould cavity 20 or 20' respectively.

For those sticks S which are assigned to a front mould cavity 20 there is provided a front storage container 30; those sticks S which are to be inserted into one of the rear mould cavities 20' are held ready, on the other hand, in a rear storage container 30'. The two storage containers 30 and 30' are identical to one another and the same is also true of the devices which are directly associated with one of these storage containers. Therefore, only the storage container 30 together with the associated devices will be described in detail below with reference to FIGS. 3 to 5.

Figure 3:
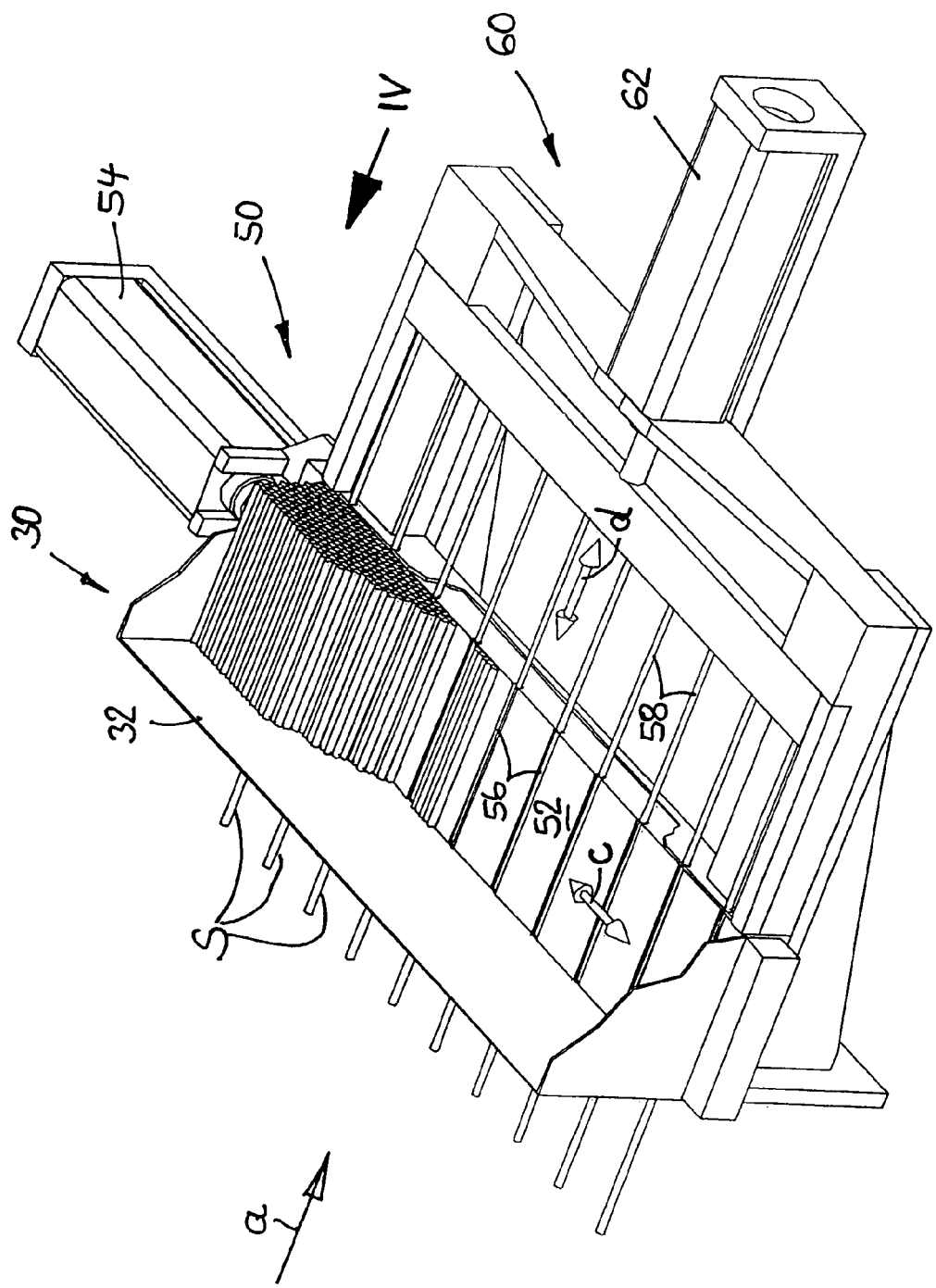
FIG. 3 shows an assembly from the right-hand area of the device in FIGS. 1 and 2, once again from a different perspective.

The storage container 30 is a rectangular box open at the top, whose width corresponds to that of the moulds 12, measured across the conveying direction a of the mould conveyor 10, and whose depth, as is clear from FIG. 3, is such that there is room in the storage container 30 for a supply of sticks 10 oriented parallel to the conveying direction a. The sticks S each lie with one of their ends against a perpendicular container wall 32, which extends across the conveying direction a and delimits the working area of a tubular rotary body 34, which may be rotated between the two storage containers 30 and 30' about its axis, hereinafter axis of rotation 36. The axis of rotation 36 is defined by a stationary shaft member 38, on which the rotary body 34 is mounted, with means of conventional type which are not illustrated, in such a way that an annular space 40 is left substantially free between the rotary body 34 and the shaft member 38. The axis of rotation 36 extends horizontally across the conveying direction a. It is sufficient for the shaft member 38 to be attached on only one side of the mould conveyor 10 to a supporting component, not illustrated, for example a rear wall of the device and for the rotary body 34 thus to be cantilevered. The advantage of this is that the rotary body 34 may be easily removed from the shaft member 38 towards the observer in FIG. 2 for cleaning purposes.

The rotary body 34 is circular-cylindrical on its inside and comprises on its outside, which was originally also circular-cylindrical, four stick holders 42 formed by milling or the like, which extend parallel to the axis of rotation 36 and are arranged at angles of 90° relative thereto. Each of the stick holders 42 comprises two rows of channels 44 and 44', which correspond in diameter and arrangement relative to one another to the centering holes 28 and 28' of the lids 24. The channels 44 are each intended to receive one stick S, which will be inserted through one of the front centering holes 28 and the associated inlet opening 22 into one of the front mould cavities 20 of one of the moulds 12; likewise, the channels 44' are associated with the rear centering holes 28', inlet openings 22' and mould cavities 20'. All the channels are arranged substantially radially relative to the axis of rotation 36 of the rotary body 34; strictly speaking, the channels 44 and 44' of each individual stick holder 44 extend at a short distance from and parallel to a central plane of the relevant stick holder 42, in which the axis of rotation 36 lies.

Figure 6:
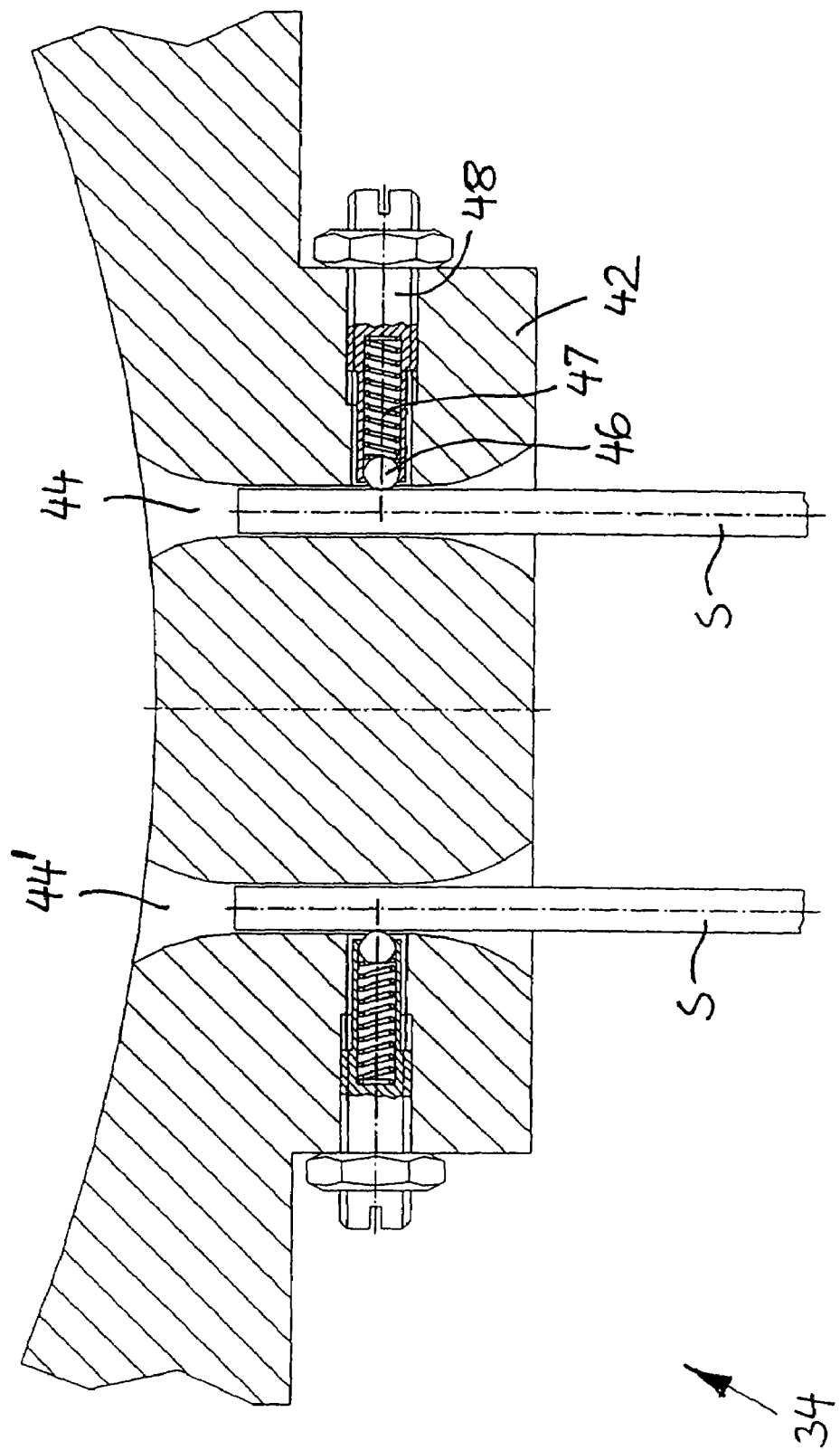
FIG. 6 shows an enlarged portion of FIG. 2 in the area designated therein with the arrow VI.

According to FIG. 6, a spherical clamping member 46 is associated with each of the channels 44 and 44', which clamping member 46 rests, via a helical spring 47, against an adjusting screw 48 screwed into the relevant stick holder 42 and is prevented from becoming separated therefrom by a flange at the inner end of the adjusting screw.

The rotary body 34 is connected with a drive, not shown, for example an electrical stepping motor, which is coordinated with the drive, likewise not shown, of the mould conveyor 10 in such a way that the rotary body 34 in each case effects a quarter turn in the direction of rotation indicated by arrow b, i.e. in the anticlockwise direction in FIGS. 1 and 2, while the mould conveyor 10 moves forwards in the conveying direction a by the distance between two successive moulds 12. After each of these movements, one stick holder 42 of the rotary body 34, pointing forwards, is located opposite the front storage container 30, so as to be able to take ten sticks S therefrom; the preceding stick holder 42 points perpendicularly upwards with the sticks S it has already taken, according to FIG. 1, without having any function in this position other than to hold said sticks firm. The stick holder 42 preceding that one, pointing backwards, is located opposite the rear storage container 30', so that its channels 44' are provided with a second row of sticks S. The stick holder 42 preceding all three of the above-mentioned stick holders, pointing perpendicularly downwards, is positioned above one of the moulds 12 plus associated lid 24, which is ready to receive all the sticks S, twenty in the example illustrated.

Figure 4:
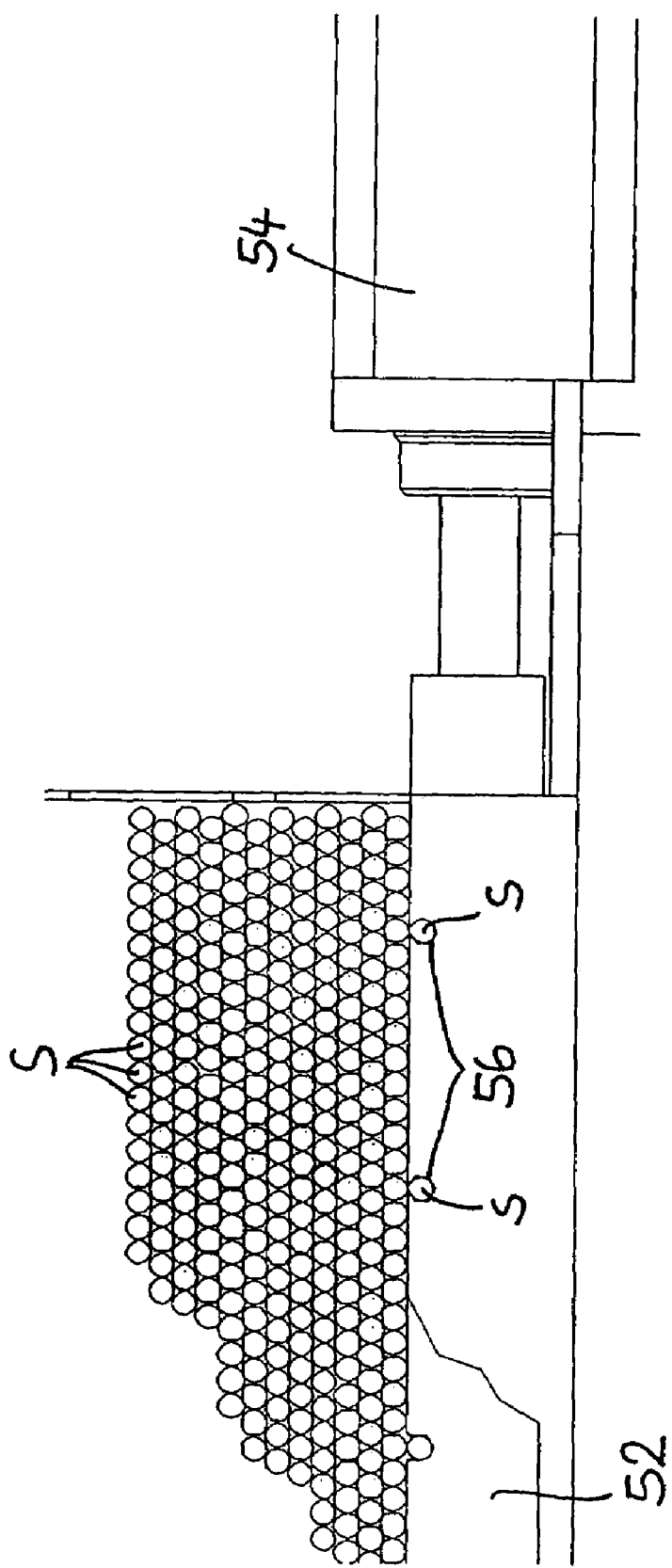
FIG. 4 shows a portion of a side view in the direction of arrow IV in FIG. 3.
Figure 5:
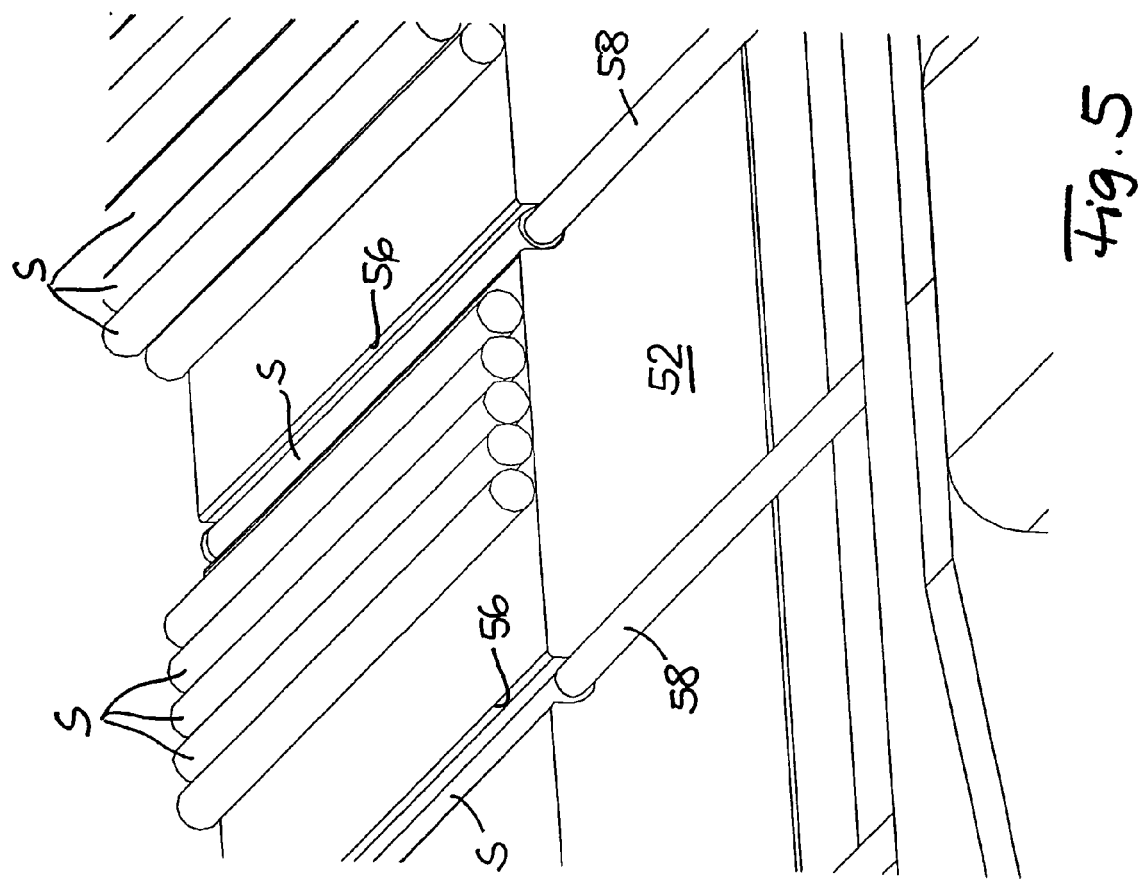
FIG. 5 is a partial view, again from a different perspective, of the assembly illustrated in FIG. 3.

As the bottom part of each of the two storage containers 30 and 30' there is provided a feeder 50 or 50' respectively; these two feeders are identical to one another, such that only the front feeder 50 needs to be described below with references to FIGS. 3 to 5. The feeder 50 comprises a plate-shaped cross slide 52, which takes the form of the floor of the storage container 30 and at the same time may be moved to and fro in FIGS. 3 and 5 parallel to the axis of rotation 36 of the rotary body 34 in the direction of double-headed arrow c by means of a piston/cylinder unit 54. The cross slide 52 extends to beneath the container wall 32 facing the rotary body 34 and comprises in its upper side parallel slots 56, open at the top, in a number and arrangement which matches that of the channels 44. When the cross slide 52 is in the rest position, each of its slots 56 is aligned with one of the channels 44 of the stick holder 42 facing the storage container 30, and thus also the associated feeder 50. Also when the cross slide 52 is in the rest position, a plunger 58 of an insertion device 60 is aligned with each of the slots, said insertion device 60 being movable to and fro in the direction of double-headed arrow d in FIG. 3 by means of a piston cylinder unit 62.

By moving the cross slide 52 to and fro one or more times, it may be ensured that one stick S from the supply contained in the storage container 30 enters each of the slots 56. When the insertion device 60 is subsequently actuated, it is thus ensured that one stick S is inserted from each of the slots 56 into the associated channel 44 of the stick holder 42 pointing forwards at that moment. As is obvious from FIG. 6, the spherical clamping member 46 projecting into the relevant channel 44 is forced outwards a little against the resistance of the associated spring, such that the inserted stick S is then clamped fast.

According to FIGS. 1 and 2, the channels 44' also have each to receive one stick S; however, this happens only when the stick holder 42 just mentioned finds itself opposite the rear storage container 30' after two further rotational steps of the rotary body 34. FIG. 6 shows clearly that all the sticks S ultimately received by the stick holder 42 are each prevented from leaving the rotary body 34 of their own accord by a spring-loaded clamping member 46.

An ejector 64 is arranged in the annular space 40 within the rotary body 34 and comprises two rows of plungers directed perpendicularly downwards, namely one row of front plungers 66 for each channel 44, and one row of rear plungers 66' for each channel 44', of the stick holder 42 which is directed downwards after the rotary body 34 has rotated one step. All the plungers 66 and 66' may be moved perpendicularly up and down in the direction of double-headed arrow e by means of a common, for example electromagnetic, drive unit 68 supported on the shaft member 38. While the rotary body 34 is turning, the ejector 64 in each case adopts an upper end position, in which the plungers 66 and 66' do not touch the rotary body 34; the piston/cylinder unit 68 is thus in each case only extended when the rotary body 34 adopts one of its rest positions according to FIGS. 1 and 2, and when in addition it is ensured that a mould 12 which has not yet been provided with sticks S, when necessary with associated lid 24, is ready precisely beneath the downwardly pointing stick holder 42.

If these prerequisites are met, all the sticks S, twenty in the example illustrated, contained in the downwardly directed stick holder 42 are each pushed downwards through a centering hole 28 or 28' and an inlet opening 22 or 22' into the associated mould cavity 20 or 20' respectively of the waiting mould 12 by the plungers 66 and 66' of the ejector 64 penetrating into the channels 44 and 44' of said stick holder 42 with a single downward stroke of said ejector 64, and are ultimately ejected out of the channels 44 and 44'. As soon as the ejector 64 has then resumed its radially inner rest position, the rotary body 34 may rotate on by one step.

Figure 7:
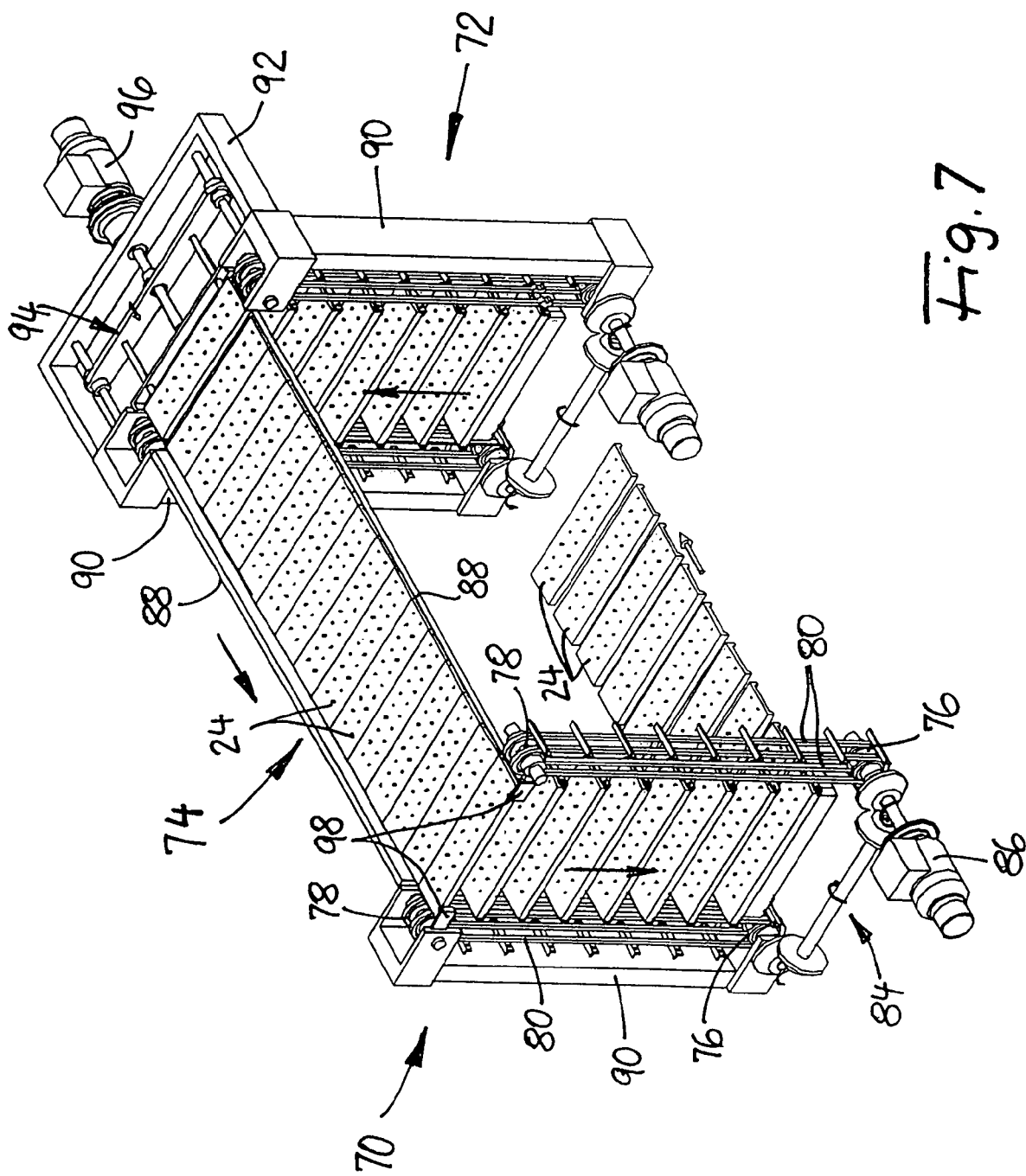
FIG. 7 is a perspective view of the device according to the invention, corresponding to FIG. 1 but complete in parts and clarified by the omission of other parts.

If the consistency of the confectionery mass K makes it necessary for the sticks S each inserted into a mould cavity 20 or 20' then to be held centered for a given time necessary for solidification of the confectionery mass K, the installation components described below are additionally brought into operation. These are substantially a lid positioning device 70, which is arranged upstream of the rotary body 34 relative to the conveying direction a of the mould conveyor 10, a lid removing device 72, which is arranged downstream of the rotary body 34, and a lid return device 74, which extends above the rotary body 34 parallel to the mould conveyor 10 and connects the lid removing device 72 with the lid positioning device 70. The lid positioning device 70 and the lid removing device 72 are of substantially the same design. The lid positioning device 70 is more clearly visible in FIG. 1 and in particular in FIG. 7; for this reason, the matching components of the two devices are provided with the same reference numerals and only the lid positioning device 70 is described in this respect below. It comprises two paternoster-like arrangements, which are located one on each side of the mould conveyor 10 and each comprise a pair of bottom return pulleys 76 and a pair of upper return pulleys 78, over which run endless conveyor strands 80, for example V-belts, toothed belts or even chains. Associated conveyor strands 80 are connected together at uniform distances by lid supports 82, which may be simple angle sections. The lower return pulleys 76 of the two mutually facing paternoster-like arrangements are connected together by an angular gear 84 and have a common drive 86, for example an electrical stepping motor, which is synchronised with the drive of the mould conveyor 10 in such a way that, each time a mould 12 enters the area between the two paternoster-like arrangements of the lid positioning device 70, a lid 24 being held ready there on a pair of opposing lid supports 82 is deposited on the mould 12 and released in the process by the lid supports 82.

While the lid positioning device 70 is thus driven in such a way that it conveys lids 24 downwards from the lid return device 44, the opposite is true of the lid removing device 72. Upon removal from its mould 12, each lid 24 is drawn off the sticks S, twenty in the example illustrated, projecting upwards out of the inlet openings 22 of the associated mould 22 and finally arrives, after several operating cycles, during which the same happens with the lids 24 of the subsequent moulds 12, at the top in the horizontal plane of the lid return device 74. The conveying direction of the lid removing device 72 is thus the reverse of that of the lid positioning device 70.

The lid return device 74 comprises two parallel guide rails 88, on which the lids 24 may be displaced with a small amount of lateral play from the upper end of the lid removing device 72 to the upper end of the lid positioning device 70. The return pulleys 76 and 78 of the lid positioning device 70 and the lid removing device 70, and accordingly also the associated endless conveyor strands 80 and lid supports 82 of these two devices, are arranged and synchronised with one another in such a way that, with each operating cycle, a pair of lid supports 82 of the lid removing device 72 carrying a lid 24 and a pair of lid supports 82 of the lid positioning device 70 not as yet carrying a lid 24 but ready to receive one are simultaneously aligned with the two guide rails 88.

This situation is used by the lid return device 74 to displace the lids 24 located in its sphere of action by a distance corresponding to the lid width. To this end, a horizontal frame 92 is attached at the top of posts 90 of the lid removing device 72, in which frame 92 a cross bar arrangement 94 may be moved to and fro in the longitudinal direction of the lid return device 74, i.e. parallel to the mould conveyor 10, by means of a piston/cylinder unit 96 supported on the frame 92. With each displacement towards the lid positioning device 70, the cross bar arrangement 94 pushes the uppermost lid 24 conveyed upwards by the lid removing device 72 off the lid supports 82, which have carried it thus far, onto the two guide rails 88. In this way, all the lids 24 which were already lying on the guide rails 88, are displaced in the direction of the lid positioning device 70 by a distance corresponding to the width of the lids, the lid 24 that was furthest to the front in this direction of displacement so moving onto the waiting uppermost pair of lid supports 82 of the lid positioning device 70. To limit the displacement, the lid positioning device 70 comprises a pair of upper limit stops 98. The space adjoining these limit stops 98 becomes free again as soon as the lid positioning device 70 moves downwards by one step, in order to position the bottom lid 24 carried thereby onto the next free mould 12.

The invention claimed is:

1. A device for inserting sticks (S) into moulds (12) for producing confectionery on a stick, having
    a mould conveyor (10) with moulds (12) arranged one behind the other in the conveying direction (a) thereof, which moulds (12) comprise mould cavities (20) which are arranged next to one another in rows and may be filled with confectionery mass (K),
    a feeder (50), which is able to provide for each row of mould cavities (20) a corresponding row of sticks (S),
    a rotary body (34), which may rotate in steps about an axis of rotation (36) arranged parallel to the rows of mould cavities (20), and
    stick holders (42), which are arranged on the rotary body (34) at angular distances corresponding to the rotary steps thereof and comprise rows of radial channels (44), into each of which a stick (S) may be inserted radially from the outside inwards, such that they are able to hold the sticks (S) in a position in which the latter project radially away from the rotary body (34),
    each stick holder (42), with each turn of the rotary body (34), finding itself opposite the feeder (50) in a first rotational angle position, in order to take therefrom a row of sticks (S), and in a last rotational angle position finding itself opposite a row of mould cavities (20), into each of which a stick (S) may be inserted by being pushed radially from the inside outwards out of its channel (44),
    characterised in that
    the rotary body (34) has an annular cross section, which leaves an annular space (40) free around a shaft member (38) defining the axis of rotation (36),
    the radial channels (44) open into the annular space (40) and
    an ejector (64) common to all the stick holders (42) is arranged non-rotatably in the annular space (40) and comprises plungers (66) for pushing the sticks (S) out of the channels (44), which plungers (66) are each able to enter the channels (44) directed towards a row of mould cavities (2) only when the rotary body (34) is at a standstill and may be withdrawn back into the annular space (40) before the next step of the rotary body (34).

2. A device according to claim 1,
    characterised in that
    the stick holders (42) each comprise two rows of channels (44, 44') for two rows of sticks (S),
    only a first row of channels (44) of the stick holders (42) is in each case located opposite the above-mentioned feeder (50) in the first rotational angle position of the rotary body (34), in order to take a first row of sticks (S) therefrom,
    adjacent the rotary body (34) there is arranged a second feeder (50'), opposite which the second row of channels (44') of the stick holders (42) in each case finds itself in a second rotational angle position of the rotary body (34), in order to take a second row of sticks (S), and
    each mould (12) contains two rows, arranged one behind the other in the conveying direction (a) of the mould conveyor (10), of mould cavities (20, 20') arranged next to one another, into which the sticks (S) of the first and second rows respectively are intended to be inserted.

3. A device according to claim 2,
    characterised in that
    the second feeder (50') has its own, second storage container (30') associated with it.

4. A device according to claim 1, characterised in that each feeder (50, 50') comprises a cross slide (52), which
    closes the associated storage container (30, 30') at the bottom,
    may be moved to and fro transversely of the radial channels (44, 44') and
    comprises slots (56) open towards the inside of the storage container (30, 30'), which slots (56) are each aligned with one of the radial channels (44 or 44') in one of the stick holders (42) of the rotary body (34) after each step of the rotary body (34) when the cross slide (52) is in a rest position.

5. A device according to claim 1,
    characterised in that the radial channels (44, 44') contain spring-loaded clamping members (46), which prevent the sticks (S) from slipping out prematurely.

6. A device for inserting sticks (S) into moulds (12) for producing confectionery on a stick, having
    a mould conveyor (10) with moulds (12) arranged one behind the other in the conveying direction (a) thereof, which moulds (12) comprise mould cavities (20) which are arranged next to one another in rows and may be filled with confectionery mass (K),
    a feeder (50), which is able to provide for each row of mould cavities (20) a corresponding row of sticks (S),
    a centering device being arranged on each mould (12), which device comprises a centering hole (28) over each mould cavity (20) for the associated stick (S),
    characterised in that
    the centering device takes the form of a lid (24) which may be positioned on the associated mould (12),
    a lid positioning device (70) is arranged upstream, in the conveying direction, of the area in which the sticks (S) are inserted into the moulds (12),
    a lid removing device (72) is arranged downstream of the above-mentioned area in the conveying direction, and
    the lid removing device (72) is connected to the lid positioning device (70) by a lid return device (74).

7. A device according to claim 6,
    characterised in that the mould conveyor (10), insofar as it is conveying moulds (12) covered with lids (24), forms together with the lid removing device (72), the lid return device (74) and the lid positioning device (70) a continuous conveying circuit surrounding the rotary body (34).

8. A device according to claim 6,
    characterised in that the lid positioning device (70) and the lid removing device (72) each comprise two paternoster-like arrangements, which are positioned one on each side of the mould conveyor (10) and are formed in such a way by lower and upper return pulleys (76, 78) and endless conveying members (80) running thereover with spacedly arranged lid supports (82) that lid supports located in same height pairs are in each case able jointly to support one lid (24) and to transfer it in a horizontal position between the mould conveyor (10) and the lid return device (74).

9. A device according to claim 8, characterised in that the lid return device (74) comprises a pair of guide rails (88), with which a pair of lid supports (82) in the area of the upper return pulleys (78) of each of the lid positioning device (70) and the lid removing device (72) may be brought simultaneously into alignment, and the two paternoster-like arrangements of the lid removing device (72) are connected together in the area of their upper return pulleys (78) by a crosshead (92), which bears a drive (94, 96) movable to and fro, by which the lids (24) may be displaced in steps, lid by lid, from one pair of lid supports (82) of the lid removing device (72) onto the guide rails (88) and from these onto a pair of lid supports (82) of the lid positioning device (70).

\* \* \* \* \*